United States Patent [19]
Gachot

[11] Patent Number: 4,658,487
[45] Date of Patent: Apr. 21, 1987

[54] METHOD FOR THE MANUFACTURE OF A PISTON

[76] Inventor: Jean Gachot, 26 bis avenue de Paris, 95230 Soisy Sous Montmorency, France

[21] Appl. No.: 158,155

[22] Filed: Jun. 10, 1980

[30] Foreign Application Priority Data

Jul. 3, 1979 [FR] France .................................. 79 17188

[51] Int. Cl.⁴ ........................................... B23P 15/10
[52] U.S. Cl. ................................. 29/156.5 R; 29/417; 72/254; 92/136
[58] Field of Search ...................... 92/136; 29/156.5 R, 29/417, 412, 159.2, 557, 558, DIG. 26; 72/254, 255

[56] References Cited

U.S. PATENT DOCUMENTS

| Re. 27,339 | 4/1972 | Dornbos | 29/417 |
| 692,393 | 2/1902 | Weimor | 92/136 |
| 1,860,605 | 5/1932 | Baldwin, Jr. | 29/558 |
| 2,309,666 | 2/1943 | Parker | 29/157.1 R |
| 2,957,361 | 10/1960 | Herbenor | 92/136 |
| 3,028,662 | 4/1962 | Pessl et al. | 29/159.2 |
| 3,166,832 | 1/1965 | Scannell | 29/156.5 R |
| 3,709,098 | 1/1973 | Lloyd | 92/136 |
| 3,909,908 | 10/1975 | Brefka | 29/417 |
| 4,030,179 | 6/1977 | Schwarz | 29/417 |
| 4,167,897 | 9/1979 | Bunyard | 92/136 |

FOREIGN PATENT DOCUMENTS

| 1957665 | 6/1970 | Fed. Rep. of Germany | 92/136 |
| 2405297 | 8/1975 | Fed. Rep. of Germany | 92/136 |
| 2808053 | 9/1978 | Fed. Rep. of Germany | 92/136 |

Primary Examiner—Daniel C. Crane
Attorney, Agent, or Firm—Young & Thompson

[57] ABSTRACT

The method relates to the manufacture of a piston. This piston comprises a head and a stem extending transversely with respect to the head. A profiled element in bar form is first taken, the profile of which envelops that of the piston. This profiled element is cut up into slices, the width of each slice being at least equal to the maximum diameter of the piston, and the material of the profiled element slice which extends relatively beyond the desired profile for the piston is removed by machining. The method is particularly useful for manufacturing remote-controlled actuators for valves.

8 Claims, 16 Drawing Figures

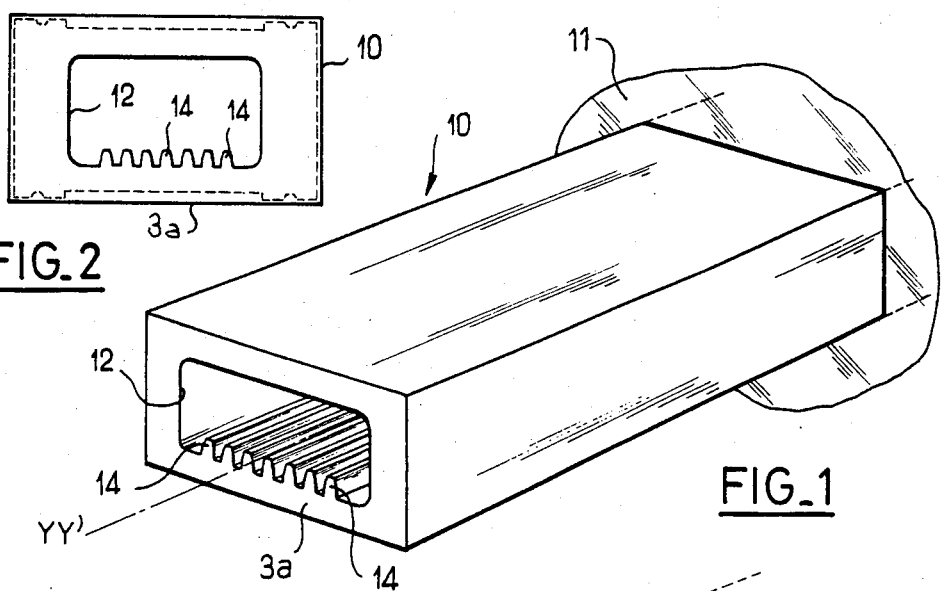
FIG.2
FIG.1
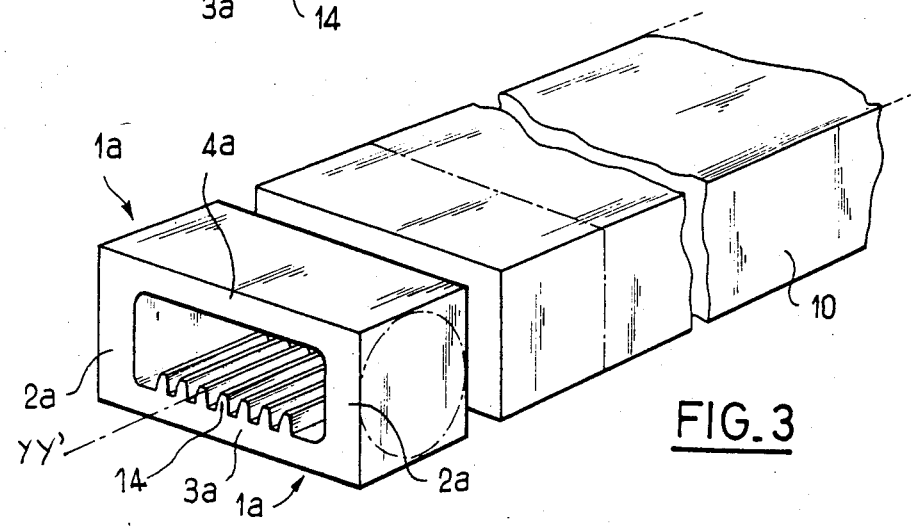
FIG.3
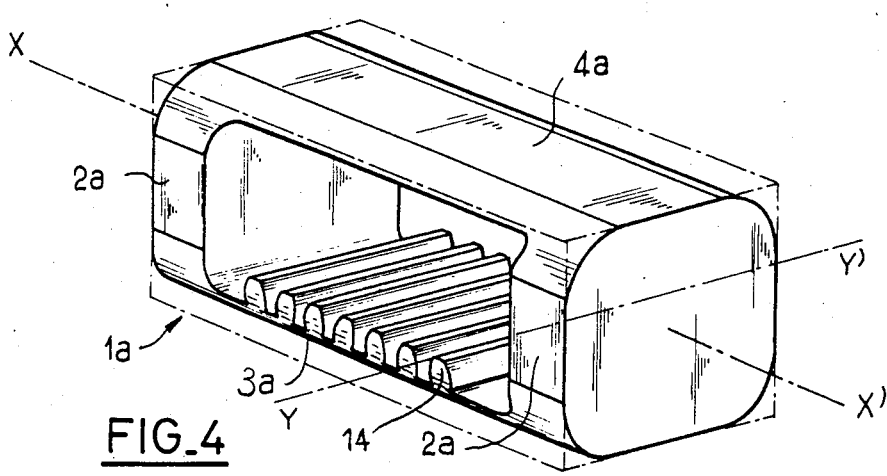
FIG.4

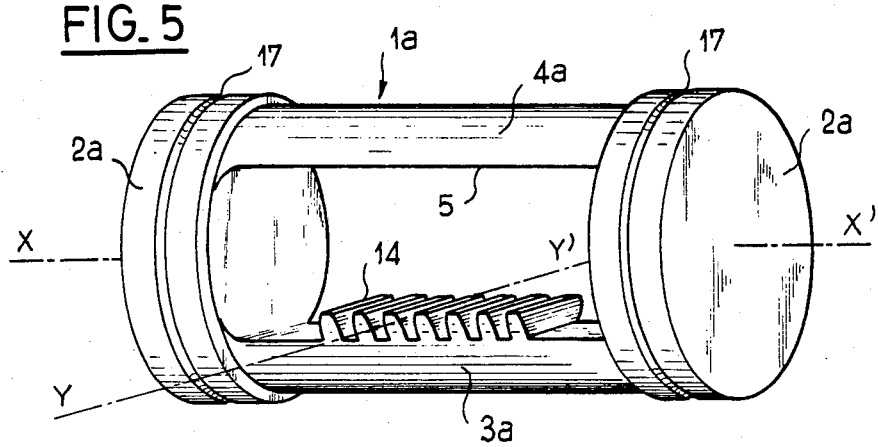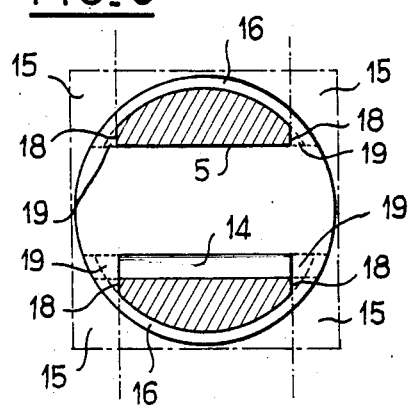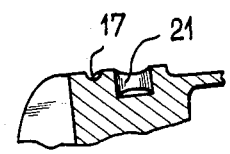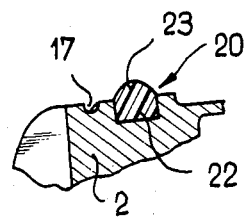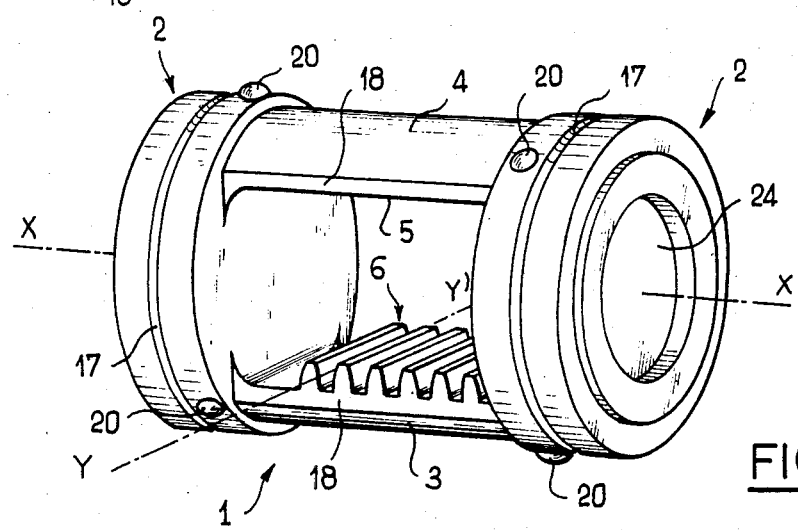

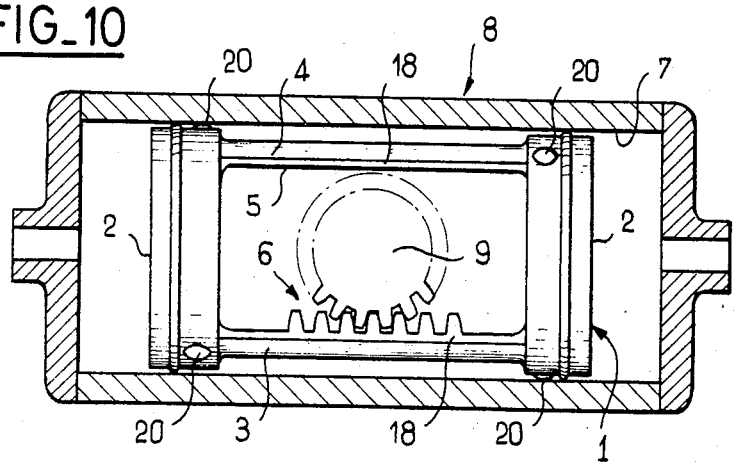
FIG_10
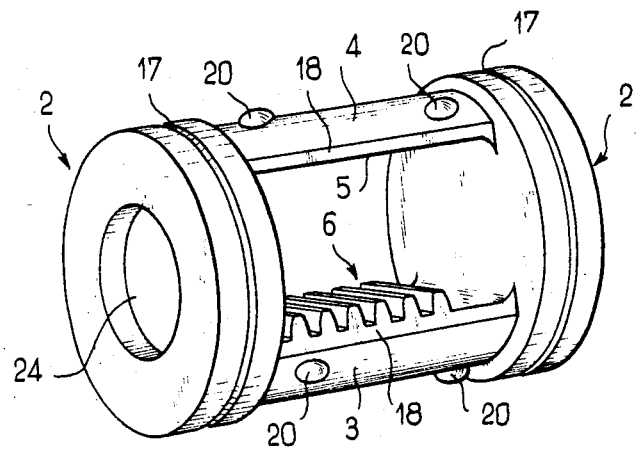
FIG_11
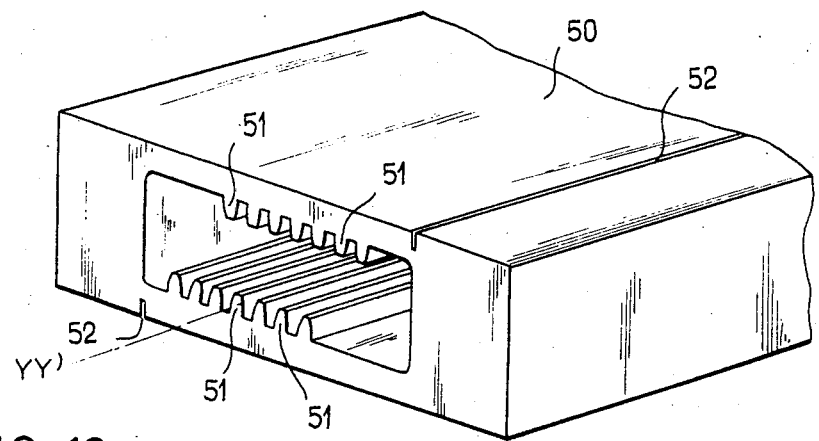
FIG_12

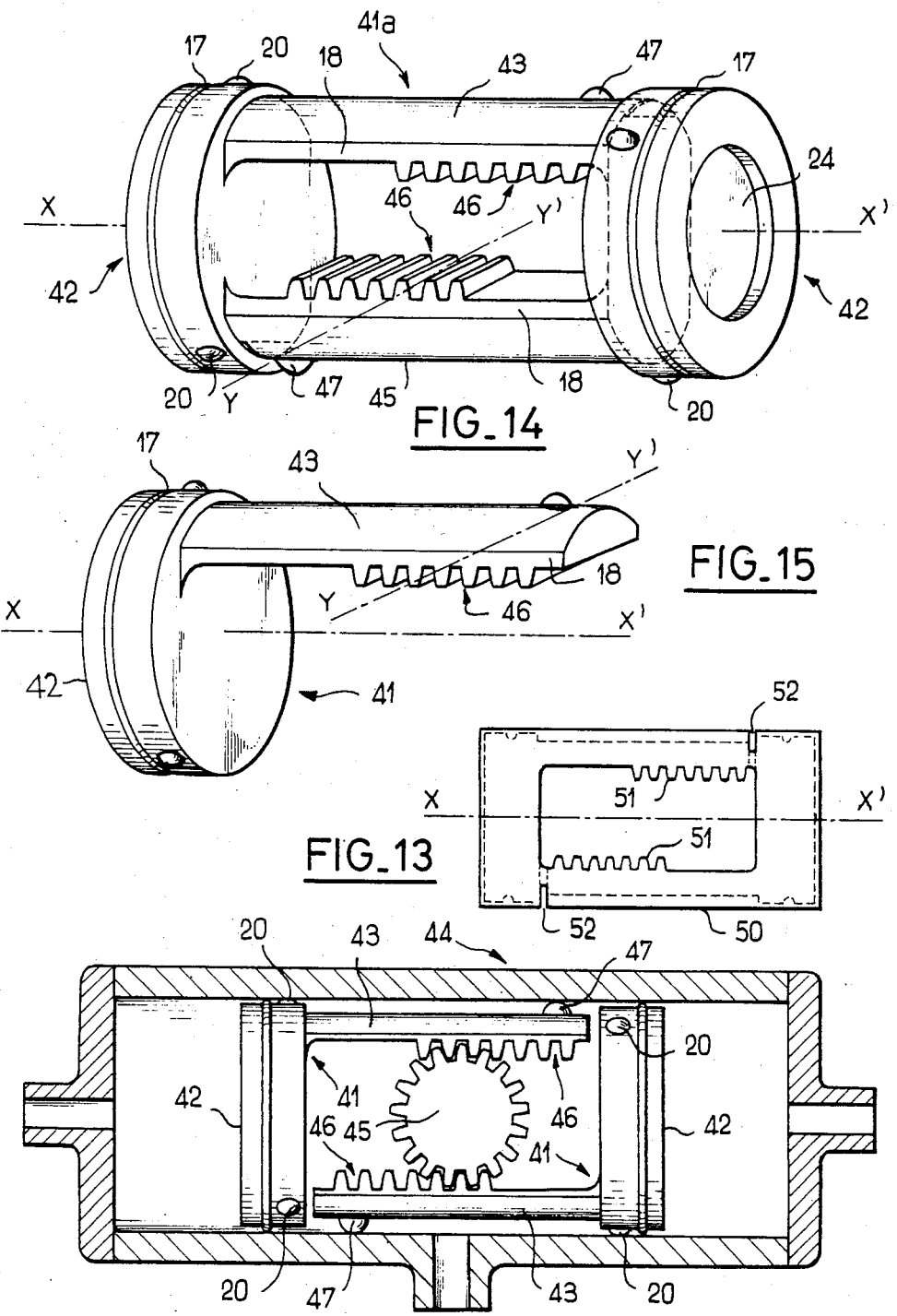

METHOD FOR THE MANUFACTURE OF A PISTON

BACKGROUND AND GENERAL DESCRIPTION OF THE INVENTION

The invention relates to a method for the manufacture of a piston, notably such as those employed in pressurized fluid actuators for the remote control of cocks, valves or the like.

Pistons of the type envisaged by the invention mostly comprise a head whose periphery ensures the guidance in the cylinder of the actuator. This head is rendered fast to means for transmitting the movement of the piston to an output shaft arranged transversely to the cylinder.

This is the case notably of rack pistons in which a piston end is fixed to the head and carries a rack arranged longitudinally with respect to the axis of the head to mesh with a pinion fixed to the transverse output shaft.

These pistons called single pistons, are generally mounted as an opposed pair in the same cylinder meshing with a single pinion.

The invention applies also to the manufacture of double pistons of the type contemplated in Applicant's French Patent Application No. 79/13337.

Such a double piston comprises two heads coupled together through at least one cross-member bearing the rack arranged longitudinally.

To manufacture notably single pistons such as defined above, it is known to manufacture them by forging or molding a blank which is then machined to produce the various support, guidance and seal-holding surfaces, as well as the rack.

This method is long, expensive and unprofitable on the mass production scale.

It is an object of the present invention to overcome these drawbacks by providing a method for the manufacture of pistons which is rapid, economical and particularly advantageous on the mass production scale.

It is also an object of the invention to provide a method for the manufacture of a piston, notably for actuating valves and the like. This piston comprises a head and at least one transmission member extending transversely with respect to the head.

According to the invention, the method is characterised in that a sectional element in bar form is taken whose profile envelops essentially that of the piston, then cutting up this profiled element into slices, the width of each slice being at least equal to the maximum diameter of the piston and removing by machining the material of the slice of the profiled element which extends relatively beyond the profile desired for the piston.

Thus, the often complex and difficult-to-machine surfaces bounding the profile of the piston are here obtained directly, or at least in blanks, by extrusion, whilst the surfaces of revolution around the axis of the head result from a simple inexpensive machining operation, for example turning.

This method hence considerably simplifies the machining operations necessary for manufacturing the piston, and dispenses also with forging or molding an initial blank, the latter being obtained according to the invention by slicing the profiled element.

Applicant has the merit of having developed a particulary economical method that the technician skilled in the art would have been dissuaded from applying, since it involves the removal of a relatively large amount of material by turning, and hence appears a priori expensive, but also and especially since it is contrary to the usual teachings to manufacture, starting from a profiled element, parts whose principal axis is perpendicular to the direction of extrusion.

Other features and advantages of the invention will emerge also from the following description relating to nonlimiting examples of its application.

BRIEF DESCRIPTION OF THE DRAWINGS

In the accompanying drawings:

FIG. 1 is a perspective view of an embodiment of a profiled element in the course of extrusion;

FIG. 2 is a diagrammatic view of the cross-section of the profiled element;

FIG. 3 is a perspective view of the profiled element in the course of cutting up;

FIG. 4 is a perspective view of a double piston blank in the course of turning;

FIG. 5 is a perspective view of the blank after turning;

FIG. 6 is a cross-sectional view of the blank after turning and milling;

FIGS. 7 and 8 are partial views in perspective and in cross-section, of the head of the piston respectively before and after assembly of one of the guide shoes;

FIG. 9 is a perspective view of an embodiment of a finished double piston;

FIG. 10 is a sectional view of a double-acting actuator in which the piston is mounted;

FIG. 11 is a perspective view of a modification of the double piston;

FIG. 12 is a partial perspective view of a profiled element designed for the manufacture of single pistons in pairs;

FIG. 13 is a diagrammatic view of the cross-section of the profiled element of FIG. 12;

FIG. 14 is a perspective view of a pair of two pistons before separation;

FIG. 15 is a perspective view of one of the pistons of FIG. 14 in finished state; and FIG. 16 is a sectional view of a double-acting actuator in which is mounted a pair of pistons obtained by separation of those of FIG. 14.

DESCRIPTION OF PREFERRED EMBODIMENTS

In the embodiment of the method of the invention illustrated in FIGS. 1 to 10, the method relates to the manufacture of a double rack piston. This piston 1 (FIG. 9) comprises two opposite heads 2 with a common axis XX', coupled by two cross-members 3 and 4 transverse to the heads 2 and defining between them a substantially rectangular opening 5. The cross-member 3, which constitutes a transmission member for the motion of piston 1, carries a rack 6 whose teeth project into the opening 5 towards the other cross-member 4. The rack 6 extends longitudinally with respect to the axis XX'. Thus the profile of the opening 5, and in particular that of the teeth of the rack 6 is constant along the direction YY' of these teeth transverse to the axis XX'.

As is shown in FIG. 10, the piston 1 thus constituted may be mounted in the cylinder 7 of an actuator 8, the rack 6 meshing with a pinion 9 mounted transversely, in the direction YY', in the cylinder 7 and fastened to the output shaft of the actuator 8.

In accordance with the invention, to manufacture the piston A, a profiled element 10 (FIG. 1) obtained at the output of an extruder 11, and advantageously constituted from an extrudable metal such as an aluminium alloy, is first taken. The profiled element 10 is tubular, and its profile (in full line in FIG. 2), substantially rectangular, envelops the profile of the piston 1 (in dashed line in this Figure), seen in the direction YY'. In addition, the inner contour 12 of the profiled element 10 faithfully reproduces the profile of the opening 5, seen in the direction YY'. Thus, one of the wings 3a of the profiled element 10 bears, on its inner surface, the teeth 14 whose profile is the same as that of the teeth of the rack 6.

A slice 1a of width slightly greater than the diameter of the head 2 (in dashed line in this Figure) is then cut off from the profiled element 1, transversely to the axis YY', as shown in FIG. 3. The slice 1a which constitutes a blank for the piston 1, comprises two heads 2a connected by two cross pieces 3a, 4a.

As shown in FIG. 4, turning of the blank 1a by rotation around the axis XX' then follows, so as to machine both the periphery of the heads 2a and the outer surface of the cross members 3a, 4a. Then a diameter slightly greater than that of the outer surface 3a, 4a (FIG. 5) is then conferred on the heads 2a.

The turning of the blank 1a results in removing the zones 15 (FIG. 6) material each corresponding to a ridge of profiled element 10, and two curved zones 16 corresponding to the difference in diameter desired between the cross-members 3a, 4a, and the heads 2a.

A groove 17 intended to receive a toric fluid-tight seal is then formed also, in the course of turning, around each head 2a.

In a latter step, the edges of the cross-members 3a, 4a on each side of the opening 5 are machined by milling, in a plane 18 (FIGS. 6 and 9) transverse to the teeth of the rack 6 and common to the two cross-members 3a, 4a. Thus, the teeth of the rack are freed from flash or spikes resulting from the turning, and the lengths of their top and their base are made identical. This flash removal consisted of removing four zones of material 19 at the longitudinal edges of the cross-members 3a, 4a (FIG. 6).

In order to provide each head 2 with three guide shoes 20 of plastics material (polytetrafluoroethylene for example) distributed over their periphery (FIG. 9) between the groove 17 and the cross-members 3, 4, a blind cylindrical hole 21 is pierced by means of a drill at each position desired for the shoes 10 (FIG. 7), and there is inserted by force fitting into each of the holes 21 (FIG. 8), a shoe 20 comprising a cylindrical anchoring base 22 and a rounded frictional head 23.

It is advantageously arranged so that, as shown in FIG. 9, the shoes 20 of one of the heads 2 are off-set by 60 approximately around the axis XX' with respect to those of the other head.

Also, there is machined, on the front surface of each head 2, a cylindrical reinforcement (FIG. 9) centered on the axis XX'. These reinforements 24 can, for example, serve as a support base for a spring (not shown) for returning the piston of a single-acting actuator into resting position.

The piston 1 offers numerous advantages, of which certain are described in patent application No. 79/13337 already mentioned, resulting from its particular rack structure 6 installed in the opening 5 formed between two cross-members 3, 4 connecting the two heads 2.

Now the manufacture of the piston 1 poses a priori a problem of manufacture of the rack.

As has been observable in the course of the description, this problem is easily resolved by the present invention avoiding any machining in the scarcely accessible space of the opening, and also by avoiding the use of a rack fastened thereon.

According to a modification of this method, shown in FIG. 11, the shoes 20 are mounted, not at the periphery of the heads 2, but on the cross-members 3, 4, in blind holes pierced from the outer surface of the latter in the vicinity of the heads 2.

The bulged portion of these shoes 20 is then higher to compensate for the difference in diameter existing between the outer surface of the cross-members 3, 4 and the heads 2.

There are three shoes 20 close to each head 2, distributed angularly as far as the width of the cross-members 3, 4 permits. Preferably, each of the cross-members 3, 4 bears a shoe 20 at one end and two at the other.

Thus, the heads 2, whose thickness is no longer conditioned by the diameter of the shoes 20, may be thinner, and hence lighter.

In the embodiment of the method shown in FIGS. 12 to 16, the method according to the invention is directed to the manufacture of a pair of single rack pistons 41.

The pistons 41 comprise a head 42 with an axis XX' (FIG. 15) fast to a stem 43 extending longitudinally with respect to the axis XX', but outside of this axis. From its surface directed towards the axis XX', the stem 43, which constitutes a transmission member for the motion of the piston 1, bears a rack 46 which extends parallel to this axis, so that its teeth are transverse to the axis XX'. Thus, the profile of the surface of the stem 43 turned towards the axis XX', notably of the teeth of the rack 43, is constant along the direction YY' of these teeth.

The pistons 41 are generally associated by pairs in an actuator 44, as shown in FIG. 16. Their racks 46 then engage on both sides of the same pinion 45 fixed to the output shaft of the actuator 44.

In accordance with the invention, to manufacture a pair of pistons 41, a tubular extruded profiled element 50 is first taken, (FIG. 12) whose profile (in solid line in FIG. 13), substantially rectangular, envelops the profile (in dashed line in this Figure, seen along YY', of two pistons 41 coupled head to tail, with their stems 43 opposed with respect to the axis XX'. In addition, the profile of each of the two opposite inner surfaces of the profiled element 40, provided with teeth 51, faithfully reproduces that of the surface turned towards the axis XX' of a stem 43 with its rack 46, whilst the profile of each of the two other inner faces faithfully reproduces that of the rear face of a head 42.

The profiled element 50 also has two diagonally opposite grooves 52 each of which runs along an outer ridge in extension of one of the inner surfaces not bearing teeth, these grooves 52 each defining a line along which one of the heads 42 will subsequently be separated from the stem 43 associated with the other head.

Cutting off a slice or blank 41 then follows, then its turning around the axis XX' and milling of the edges of the stems 43, and notably of the racks 46, as well as the positioning of the shoes 20 on the periphery of the heads 42, in accordance with what has been explained with reference to FIGS. 1 to 10.

Complementarily, a guidance shoe 47 is forced therein, whose bulged portion is higher than that of the shoes 20 of the heads 42, in a blind hole pierced from the outer surface of each stem 43, at its end opposite the head 42 designed to be associated with it.

The blank is then sawn along each of the grooves 52, so that the two pistons 41 are detached from one another.

Once mounted in the body of the actuator 44, each piston 41 is guided at the level of its head 42, by means of three shoes 20, and, at the level of its stem 43, between the pinion 45 and the shoe 47.

In this embodiment, the method according to the invention is particularly economical since it enables the manufacture of two identical pistons from a single blank of which the essential machining of the two pistons is carried out in common.

As a result, there are, in addition, improved working conditions, since the blank, through its substantially cylindrical outer shape, is easier to install in machine tools than pistons 41.

Of course, the invention is not limited to the examples described, and numerous modifications or improvements could be introduced therein, without departing from its scope.

Thus, the invention could be applied to very varied pistons such as pistons bearing a stem terminated by a ring with an axis transverse to the axis of the piston, this ring being designed for coupling the piston with a connecting rod, a slider or the like.

In this embodiment, the stem and the ring would be obtained directly by extrusion.

On the other hand, it could be provided for the blind holes for the shoes to be slightly throttled, in order to ensure better holding of the shoes.

In another modification, it is possible to manufacture a double-acting rack piston of relatively large diameter by starting from a slice of a profiled element whose thickness, measured transverse to the cross-members 3a, 4a is substantially less than this diameter, then by screwing on each side of this slice piston heads of the desired diameter for the piston and of conventional construction. Preferably the width of the slice cut off of the profiled element is close to this diameter. Under these conditions, the length of the teeth of the rack is optimal. There is obtained in this way a double piston formed from two heads coupled through a tubular web bearing the rack. This modification enables the manufacture of pistons of different diameters from a single profiled element by adapting the width of the cut off portion to the fixed diameter.

I claim:

1. Method for the manufacture of a rack piston, said piston comprising at least one head, at least one transmission member extending traversely to the head, and a rack fast to the transmission member and arranged longitudinally with respect to the axis of the head, said method comprising extruding a profiled bar whose profile envelops essentially that of the piston and has a wing provided with teeth whose profile is that of the teeth of the finished rack, said profiled bar having a uniform cross-sectional configuration throughout its length and said teeth extending lengthwise of the extruded bar, cutting off slices from this profiled bar, the width of each slice being at least equal to the maximum diameter of the piston, and removing by machining the material of the profiled slice which extends beyond the desired profile for the piston, said machining being effected by turning the material of the profiled slice about an axis which is both perpendicular to the length of the extruded bar from which said slice was cut and parallel to the longitudinal direction of the rack.

2. Method according to claim 1, wherein after machining, three blind holes are formed on the periphery of each head, and a guide shoe of plastics material is force-fitted into each of these holes.

3. Method according to claim 1, wherein after machining, three blind holes distributed close to each head are formed from the outer surfaces of the wing bearing the teeth and of the opposite wing, and a guide shoe of plastics material is force-fitted into each of these blind holes.

4. Method according to claim 1, wherein after machining, the lateral edges of each rack are machined by milling, in a plane transverse to its teeth, to remove flash therefrom.

5. Method according to claim 1, wherein to enable the production of a double piston, the following operations are carried out:
   manufacturing a tubular profiled bar of substantially rectangular cross-section, while providing one of the inner faces of this tube with teeth designed to constitute the teeth of the rack;
   after having cut off a slice of this profiled element, machining this slice by turning on an axis parallel to the longitudinal direction of the rack, so as to constitute a piston head in each wing adjacent to that bearing the teeth.

6. Method for the manufacture of a rack piston, said piston comprising at least one head, at least one transmission member extending transversely to the head, and a rack fast to the transmission member and arranged longitudinally with respect to the axis of the head, said method comprising starting from a profiled bar whose profile evelopes essentially that of the piston and has a wing provided with teeth whose profile corresponds to that of the teeth of the rack, cutting off slices from this profiled element, the width of each slice being at least equal to the maximum diameter of the piston, and removing by machining the material of the profiled element slice which extends beyond the desired profile for the piston,
   for manufacturing two single pistons each having a head and a transmission member, comprising the following steps:
   manufacturing a tubular profiled bar of substantially rectangular cross-section, while providing two opposite wings with teeth on their inner surfaces;
   after having cut off a slice, machining this slice by turning on an axis parallel to the longitudinal direction of the racks, so as to constitute two piston heads with each wing extending between both heads; and
   cutting the obtained part transversely to the axis of turning, at two places diagonally opposite, to separate from each head one of the adjacent wings bearing a rack.

7. Method according to claim 6, wherein, after turning, at least one blind hole is formed at the end of the wing bearing the teeth opposite the head having to be associated with it and from the outer surface of this wing, and a guide shoe of plastic material is force-fitted into this blind hole.

8. Method according to claim 6, comprising the following steps:
   during manufacture of the tubular profiled bar, providing the latter with two diagonally opposite grooves, situated respectively on a wing provided with teeth and close to a ridge; and
   after turning, sawing the turned part along these grooves in order to separate the pistons.

* * * * *